(12) United States Patent
Komatsu et al.

(10) Patent No.: US 10,436,131 B2
(45) Date of Patent: Oct. 8, 2019

(54) CONTROL DEVICE OF INTERNAL COMBUSTION ENGINE AND METHOD FOR CONTROLLING INTERNAL COMBUSTION ENGINE

(71) Applicant: HONDA MOTOR CO., LTD., Tokyo (JP)

(72) Inventors: Ryuko Komatsu, Wako (JP); Kotaro Hara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 95 days.

(21) Appl. No.: 15/785,431

(22) Filed: Oct. 17, 2017

(65) Prior Publication Data

US 2018/0112607 A1    Apr. 26, 2018

(30) Foreign Application Priority Data

Oct. 24, 2016    (JP) .................................. 2016-207430

(51) Int. Cl.
*F02B 37/18*    (2006.01)
*F02D 41/00*    (2006.01)
(Continued)

(52) U.S. Cl.
CPC .......... *F02D 41/0007* (2013.01); *F02B 37/22* (2013.01); *F02D 41/0005* (2013.01);
(Continued)

(58) Field of Classification Search
CPC .. F02D 41/0007; F02D 41/26; F02D 2250/16; F02D 2200/04; Y02T 10/144;
(Continued)

(56) References Cited

U.S. PATENT DOCUMENTS

2014/0298802 A1* 10/2014 Suzuki .................... F02D 13/02
60/602
2014/0316682 A1* 10/2014 Whitney ............... F02D 11/105
701/108
(Continued)

FOREIGN PATENT DOCUMENTS

| JP | 2001-082234 | 3/2001 |
| JP | 2006-291897 | 10/2006 |
| JP | 2013-249739 | 12/2013 |

OTHER PUBLICATIONS

Japanese Office Action for corresponding JP Application No. 2016-207430, dated Apr. 24, 2018.

*Primary Examiner* — Hai H Huynh
*Assistant Examiner* — Gonzalo Laguarda
(74) *Attorney, Agent, or Firm* — Mori & Ward, LLP

(57) ABSTRACT

A control device of an internal combustion engine, includes: a boost pressure detector to detect a boost pressure of air pressurized by a compressor of a supercharger including a turbine; and a processor configured to determine a rapid decrease in a target boost pressure; determine that an execution condition is satisfied in a case where the target boost pressure rapidly increases immediately after the rapid decrease is determined while the exhaust gas is refluxed; calculate a restriction opening control amount for an exhaust gas flow amount variable device to control a flow amount of the exhaust gas blown to the turbine so as to regulate a changing speed of an opening control amount to decrease an opening of the exhaust gas flow amount variable device when the execution condition is satisfied; and control the opening of the exhaust gas flow amount variable device according to the restriction opening control amount.

9 Claims, 9 Drawing Sheets

(51) Int. Cl.
*F02B 37/22* (2006.01)
*F02D 41/26* (2006.01)
*F02B 37/12* (2006.01)
*F02D 41/18* (2006.01)

(52) U.S. Cl.
CPC ........ *F02B 2037/125* (2013.01); *F02D 41/18* (2013.01); *F02D 41/26* (2013.01); *F02D 2200/04* (2013.01); *Y02T 10/144* (2013.01)

(58) Field of Classification Search
CPC ........ F02B 37/186; F02B 37/22; F02B 37/18; F02B 37/16
USPC ............... 123/564, 568.21; 701/108; 60/600, 60/605.2, 611
See application file for complete search history.

(56) References Cited

U.S. PATENT DOCUMENTS

2015/0354441 A1* 12/2015 Luehrsen ............ F02D 41/0007
 415/1
2016/0010541 A1* 1/2016 Wang ................... F02B 37/186
 60/602

\* cited by examiner

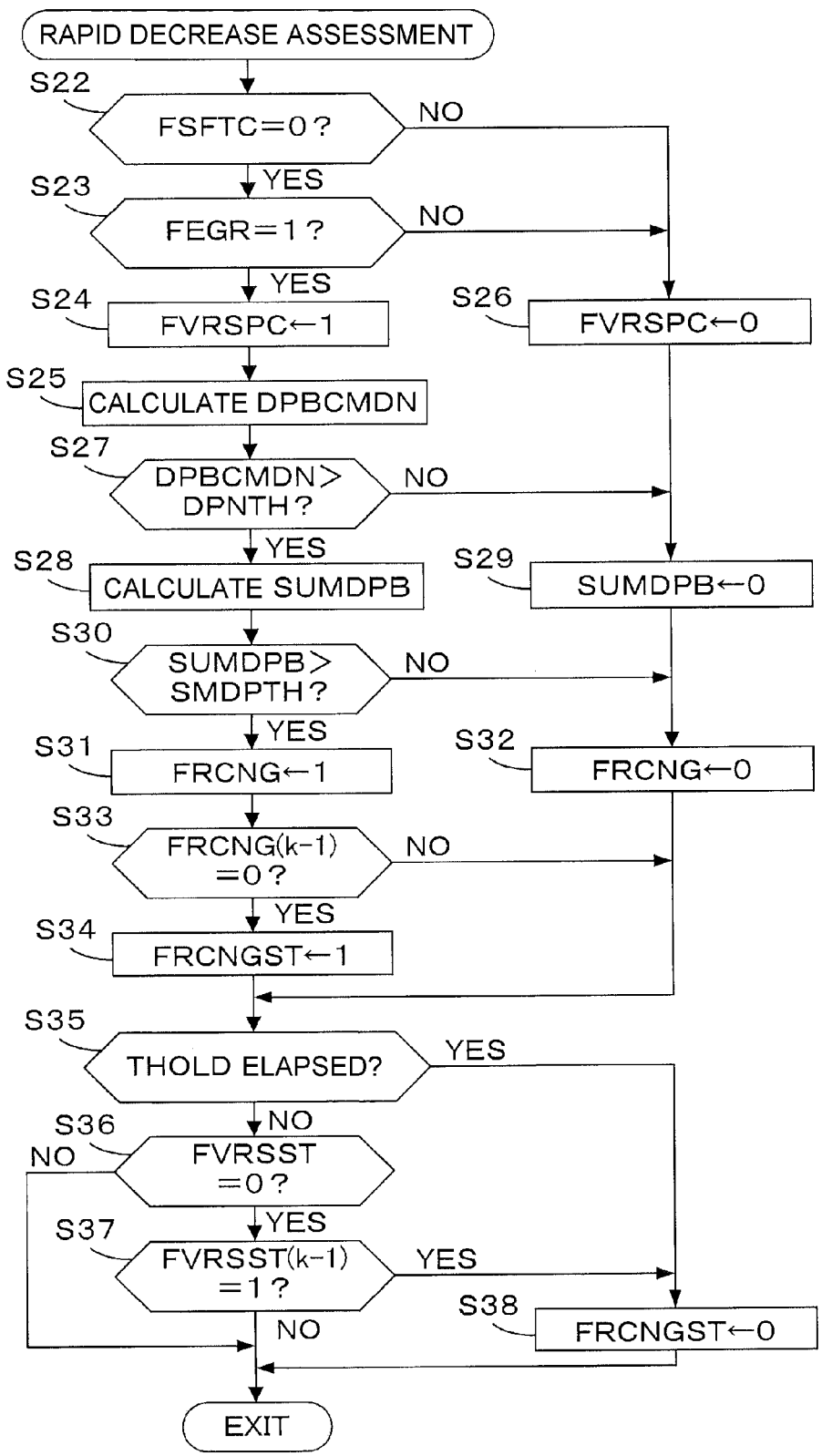

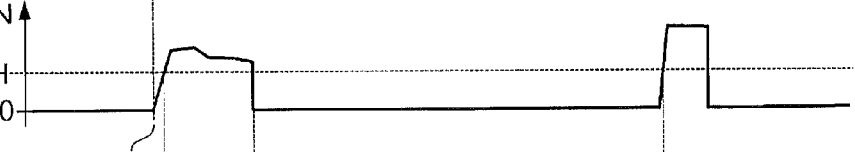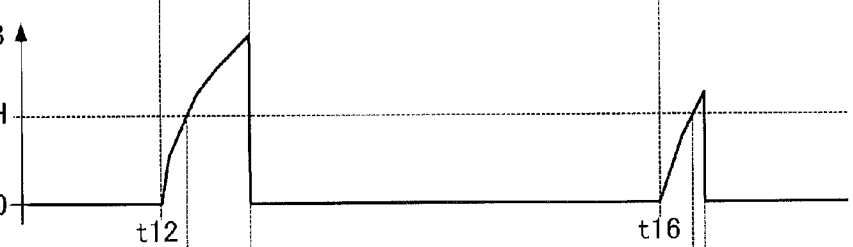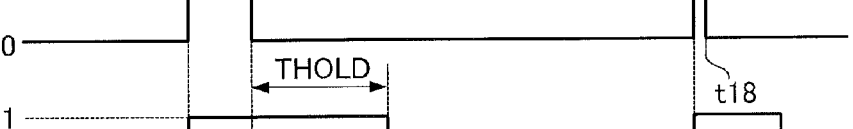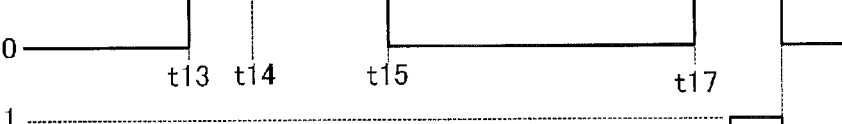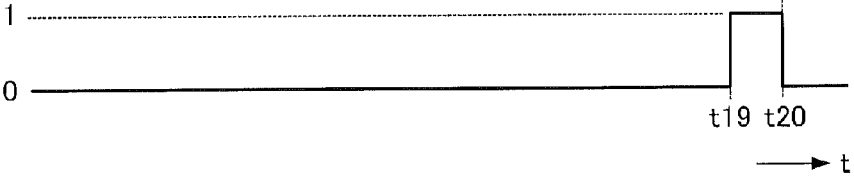

CONTROL DEVICE OF INTERNAL COMBUSTION ENGINE AND METHOD FOR CONTROLLING INTERNAL COMBUSTION ENGINE

CROSS-REFERENCE TO RELATED APPLICATIONS

The present application claims priority under 35 U.S.C. § 119 to Japanese Patent Application No. 2016-207430, filed Oct. 24, 2016, entitled "Control Device of Internal Combustion Engine." The contents of this application are incorporated herein by reference in their entirety.

BACKGROUND

1. Field

The present disclosure relates to a control device of an internal combustion engine and to a method for controlling an internal combustion engine.

2. Description of the Related Art

Japanese Unexamined Patent Application Publication No. 2013-249739 discloses a control device of an internal combustion engine that includes a supercharger and an exhaust gas reflux mechanism. This control device assesses whether or not a compressor of the supercharger becomes a surging state when a vehicle decelerates. In a case where it is assessed that the compressor becomes the surging state, a control is made such that the opening of a nozzle vane that is capable of varying the flow amount of exhaust gas which drives a turbine of the supercharger becomes equal to or more than a surge avoiding target opening, and the surging state is thereby avoided.

SUMMARY

According to one aspect of the present invention, a control device of an internal combustion engine includes a supercharger which has a compressor which pressurizes air taken into the internal combustion engine and a turbine which is connected with the compressor and driven to rotate by kinetic energy of exhaust gas of the engine, an exhaust gas flow amount variable device which changes a flow amount of exhaust gas blown to a turbine wheel of the turbine, and an exhaust gas reflux mechanism which includes an exhaust gas reflux path which connects an exhaust path and an intake path of the engine together, refluxes exhaust gas of the engine to the intake path, and is provided between an upstream side of the turbine in the exhaust path and a downstream side of the compressor in the intake path, the control device including: a target boost pressure calculation unit that calculates a target boost pressure (PBCMD) in accordance with a requested torque (TRQCMD) for the engine; a boost pressure detection unit that detects an air pressure which is pressurized by the compressor as a boost pressure; a boost pressure control unit that calculates an opening control amount (PCRFB) of the exhaust gas flow amount variable device such that the detected boost pressure (PB) matches the target boost pressure (PBCMD) and controls the boost pressure (PB) by changing an opening (VO) of the exhaust gas flow amount variable device; a target boost pressure rapid decrease assessment unit that detects a rapid decrease in the target boost pressure (PBCMD); and an execution condition assessment unit that assesses an execution condition for speed restriction control which restricts a changing speed of the opening control amount (PCRFB) immediately after the rapid decrease in the target boost pressure is detected, in which the execution condition assessment unit assesses that the execution condition is satisfied in a state where exhaust gas reflux by the exhaust gas reflux mechanism is executed and in a case where the rapid decrease in the target boost pressure (PBCMD) is detected and the target boost pressure (PBCMD) rapidly increases immediately after the detection, and the boost pressure control unit calculates a restriction opening control amount (PCRVRS) so as to regulate a changing speed of the opening control amount (PCRFB) in a direction to decrease the opening (VO) of the exhaust gas flow amount variable device in a case where the execution condition is assessed as satisfied and controls the opening of the exhaust gas flow amount variable device by using the restriction opening control amount (PCRVRS).

According to another aspect of the present invention, a control device of an internal combustion engine, includes: a boost pressure detector to detect a boost pressure of air which is pressurized by a compressor of a supercharger including a turbine to be rotated by kinetic energy of exhaust gas of the internal combustion engine to drive the compressor; and a processor. The processor is configured to calculate a target boost pressure in accordance with a target torque to be generated by the internal combustion engine; calculate an opening control amount of an exhaust gas flow amount variable device to control a flow amount of the exhaust gas blown to the turbine; control the exhaust gas flow amount variable device in accordance with the opening control amount such that the boost pressure matches the target boost pressure; determine a rapid decrease in the target boost pressure; determine that an execution condition is satisfied in a case where the target boost pressure rapidly increases immediately after the rapid decrease in the target boost pressure is determined while the exhaust gas is refluxed by an exhaust gas reflux mechanism which includes an exhaust gas reflux path connecting an upstream side of the turbine in an exhaust path and a downstream side of the compressor in an intake path to reflux the exhaust gas from the exhaust path to the intake path; calculate a restriction opening control amount so as to regulate a changing speed of the opening control amount to decrease an opening of the exhaust gas flow amount variable device in a case where the execution condition is satisfied; and control the opening of the exhaust gas flow amount variable device according to the restriction opening control amount.

According to further aspect of the present invention, a method for controlling an internal combustion engine, includes: detecting a boost pressure of air which is pressurized by a compressor of a supercharger including a turbine to be rotated by kinetic energy of exhaust gas of the internal combustion engine to drive the compressor; calculating a target boost pressure in accordance with a target torque to be generated by the internal combustion engine; calculating an opening control amount of an exhaust gas flow amount variable device to control a flow amount of the exhaust gas blown to the turbine; controlling the exhaust gas flow amount variable device in accordance with the opening control amount such that the boost pressure matches the target boost pressure; determining a rapid decrease in the target boost pressure; determining that an execution condition is satisfied in a case where the target boost pressure rapidly increases immediately after the rapid decrease in the target boost pressure is determined while the exhaust gas is refluxed by an exhaust gas reflux mechanism which includes an exhaust gas reflux path connecting an upstream side of the turbine in an exhaust path and a downstream side of the compressor in an intake path to reflux the exhaust gas from the exhaust path to the intake path; calculating a restriction opening control amount so as to regulate a changing speed of the opening control amount to decrease an opening of the exhaust gas flow amount variable device in a case where the execution condition is satisfied; and controlling the opening of the exhaust gas flow amount variable device according to the restriction opening control amount.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a flowchart of a rapid decrease assessment process that is executed in the process of FIG. 4.

FIGS. 6A to 6G are timing diagrams for explaining the process of FIG. 5.

DESCRIPTION OF THE EMBODIMENTS

Figure 1:
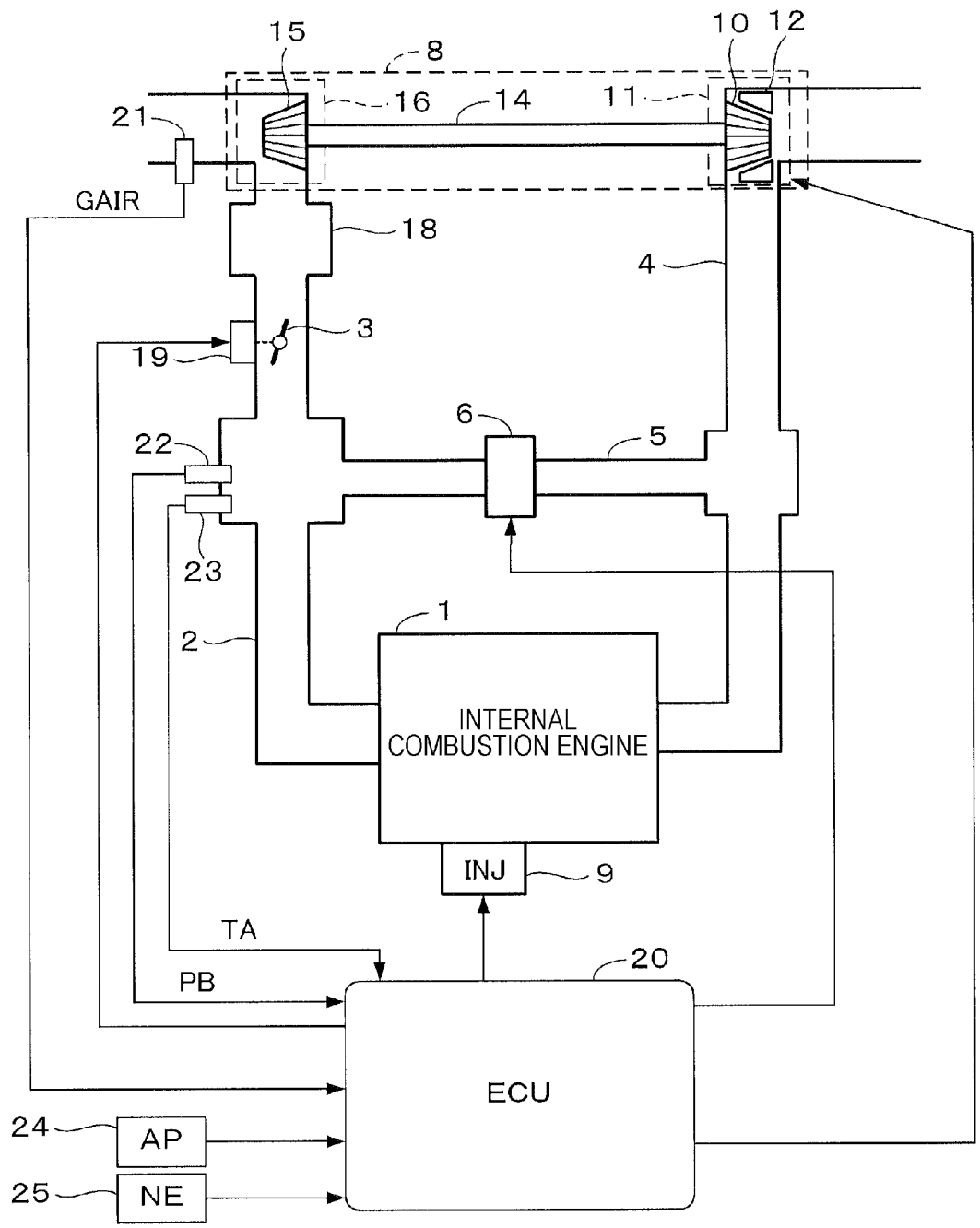
FIG. 1 is a diagram that illustrates a configuration of an internal combustion engine and a control device according to one embodiment of the present disclosure.

The embodiments will now be described with reference to the accompanying drawings, wherein like reference numerals designate corresponding or identical elements throughout the various drawings.

An embodiment of the present disclosure will hereinafter be described with reference to drawings.

FIG. 1 is a diagram that illustrates a configuration of an internal combustion engine and a control device according to one embodiment of the present disclosure. An internal combustion engine (hereinafter referred to as "engine") 1 is a diesel engine in which fuel is directly injected into a cylinder, and each cylinder is provided with a fuel injection valve 9. The fuel injection valve 9 is electrically connected with an electronic control unit (hereinafter referred to as "ECU") 20, and the fuel injection amount of the fuel injection valve 9 is controlled by the ECU 20.

The engine 1 includes an intake path 2, an exhaust path 4, and a turbocharger (supercharger) 8. The turbocharger 8 includes a turbine 11 that has a turbine wheel 10 which is driven to rotate by kinetic energy of exhaust gas and a compressor 16 that has a compressor wheel 15 connected with the turbine wheel 10 via a shaft 14. The compressor wheel 15 performs pressurization (compression) of air that is taken into the engine 1.

The turbine 11 is configured to have plural variable vanes 12 (only two are illustrated) that are driven to open or close so as to change the flow amount of exhaust gas which is blown to the turbine wheel 10 and an actuator (not illustrated) that drives the variable vane to open or close, to change the opening of the variable vane 12 (hereinafter referred to as "vane opening") VO, to thereby change the exhaust gas flow amount blown to the turbine wheel 10, and to be capable of changing the rotational speed of the turbine wheel 10. The actuator that drives the variable vane 12 is connected with the ECU 20, and the vane opening VO is controlled by the ECU 20. More specifically, the ECU 20 supplies a control signal that may vary the duty ratio to the actuator and thereby controls the vane opening VO.

An intercooler 18 is provided on a downstream side of the compressor 16 in the intake path 2, and an intake shutter 3 is provided on a further downstream side of the intercooler 18. The intake shutter 3 is configured to be capable of being driven to be opened and closed by an actuator 19, and the actuator 19 is connected with the ECU 20. The ECU 20 performs opening control of the intake shutter 3 via the actuator 19.

An exhaust gas reflux path 5 that refluxes exhaust gas to the intake path 2 is provided between the exhaust path 4 and the intake path 2, more specifically, between an upstream side of the turbine 11 in the exhaust path 4 and a downstream side of the compressor 16 in the intake path 2. The exhaust gas reflux path 5 is provided with an exhaust gas reflux valve (hereinafter referred to as "EGR valve") 6 for controlling the exhaust gas reflux amount. The EGR valve 6 is a solenoid valve that has a solenoid, and a valve opening thereof is controlled by the ECU 20. The exhaust gas reflux mechanism is configured with the exhaust gas reflux path 5 and the EGR valve 6.

The intake path 2 is provided with an intake air amount sensor 21 that detects an intake air amount GAIR, a boost pressure sensor 22 that detects an intake air pressure (boost pressure) PB on a downstream side of the compressor 16, and an intake air temperature sensor 23 that detects an intake air temperature TA. Detection signals of those sensors 21 to 23 are supplied to the ECU 20.

An accelerator sensor 24 that detects a pressing amount (hereinafter referred to as "accelerator pedal manipulation amount") AP of an accelerator pedal (not illustrated) of a vehicle that is driven by the engine 1 and an engine RPM sensor 25 that detects an engine RPM (rotational speed) NE are connected with the ECU 20, and detection signals of those sensors are supplied to the ECU 20.

The ECU 20 performs driving control of the actuator that drives the variable vane 12 of the turbine 11, the fuel injection valve 9, the EGR valve 6, and the actuator 19 that drives the intake shutter 3 based on detection signals of the above sensors and other sensors (an engine cooling water temperature sensor, an atmospheric pressure sensor, a vehicle speed sensor, and so forth), which are not illustrated.

Figure 2A:
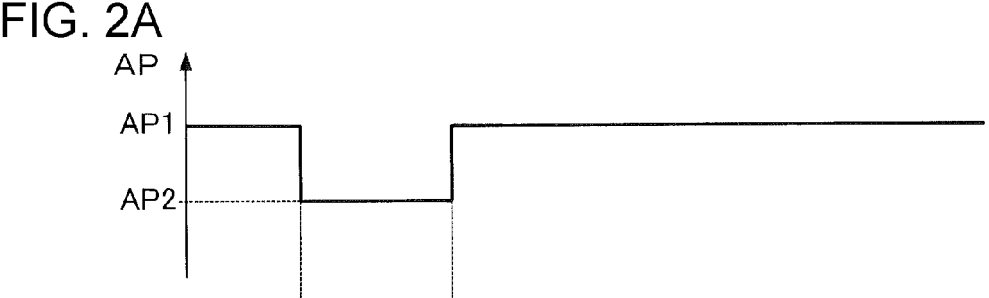
FIGS. 2A to 2C are timing diagrams for explaining problems to be solved and a solving method of the present disclosure.
Figure 2B:
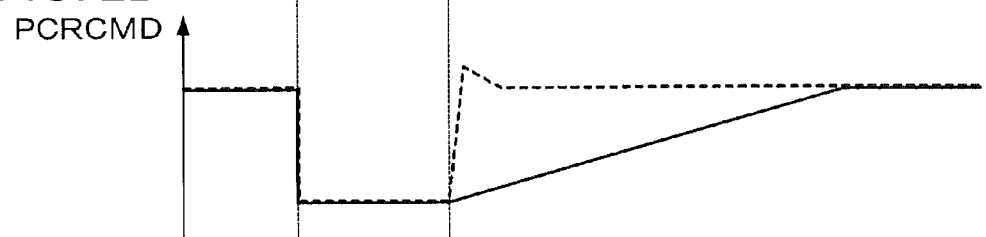
Figure 2C:
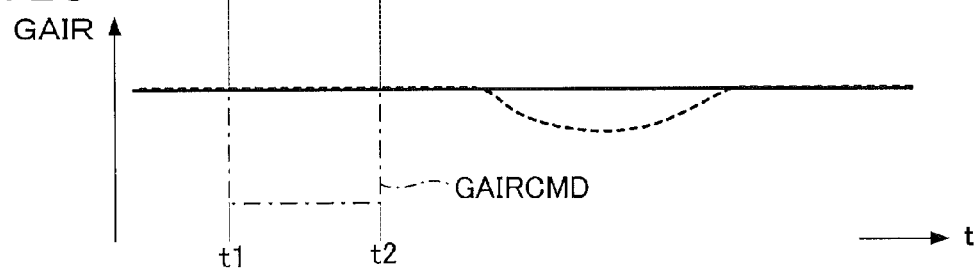

FIG. 2A to FIG. 2C are timing diagrams for explaining problems to be solved and a solving method of the present disclosure and schematically and respectively illustrate the transitions of the accelerator pedal manipulation amount AP, of a control amount (hereinafter referred to as "vane opening control amount") PCRCMD of a driving signal supplied to the actuator that drives the variable vane 12, and of the intake air amount GAIR. Here, the vane opening control amount PCRCMD is defined such that as the value thereof increases, the vane opening VO is decreased (driving is performed in the direction for closing the variable vane 12), and is calculated such that the detected boost pressure PB matches a target boost pressure PBCMD. The target boost pressure PBCMD is set mainly in accordance with the accelerator pedal manipulation amount AP (a requested torque TRQCMD for the engine 1) and the engine RPM NE.

FIGS. 2A to 2C illustrate an operation state where the accelerator pedal is rapidly returned at time t1 and is rapidly pressed to a previous accelerator pedal manipulation amount at time t2 in an operation state where the vehicle is traveling and exhaust gas reflux is executed. The time from time t1 to t2 is a very short time of approximately 200 msec. Further, values AP1 and AP of the accelerator pedal manipulation amount AP indicated in FIG. 2A are approximately 40% and 20%, respectively, when the full load state is 100%. Values AP1 and AP2 do not represent a manipulation in which the accelerator pedal is returned to a manipulation amount of 0%.

In response to the accelerator pedal manipulation illustrated in FIG. 2A, a target intake air amount GAIRCMD changes as indicated by the one-dot chain line in FIG. 2C, the target boost pressure PBCMD changes substantially similarly, and the vane opening control amount PCRCMD changes as indicated by the broken line in FIG. 2B. Thus, the vane opening VO rapidly decreases immediately after time t2, the exhaust gas pressure on an upstream side of the turbine rises, and the exhaust gas amount, which is refluxed to the intake path 2 via the exhaust gas reflux path 5, increases. As a result, as indicated by the broken line in FIG. 2C, the intake air amount GAIR decreases immediately after time t2 and may cause the surging. Note that even in a case where the target intake air amount GAIRCMD changes as indicated by the one-dot chain line, the change occurs in a very short time, and thus the intake air amount GAIR does not follow the change and hardly changes.

Accordingly, in this embodiment, as indicated by the solid line in FIG. 2B, speed restriction control that regulates an increase speed of the vane opening control amount PCRCMD at a time after time t2 is executed, the rapid decrease in the vane opening VO is thereby avoided, and as indicated by the solid line in FIG. 2C, the decrease in the intake air amount GAIR at a time immediately after time t2 is thereby inhibited.

Figure 3:
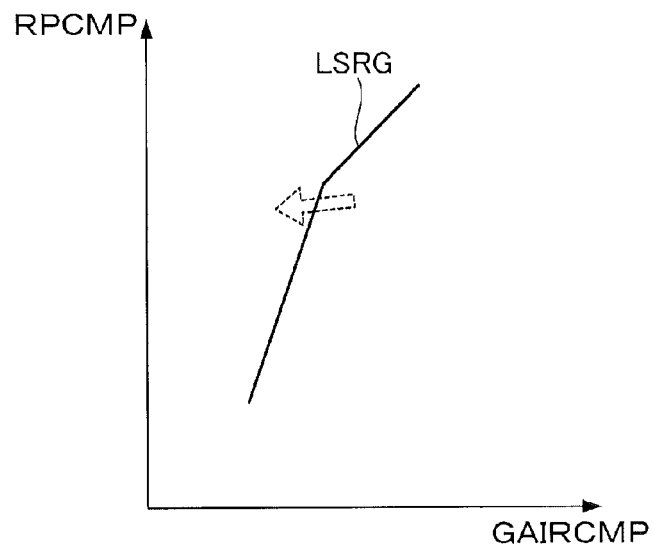
FIG. 3 is a diagram for explaining occurrence of surging.

FIG. 3 illustrates a surge line LSRG on an action plane that is defined by a compressor passing air amount GAIRCMP (=intake air amount GAIR) and a pressure ratio RPCMP between a pressure on an upstream side and a pressure on a downstream side of the compressor. As indicated by the broken line arrow, in a case where the compressor passing air amount GAIRCMP decreases and a compressor action point moves to the left side of the surge line LSRG, the surging occurs. The above-described speed restriction control is executed, a movement of the action point as indicated by the broken line arrow may thereby be avoided, and the surging may thereby be inhibited.

Figure 4:
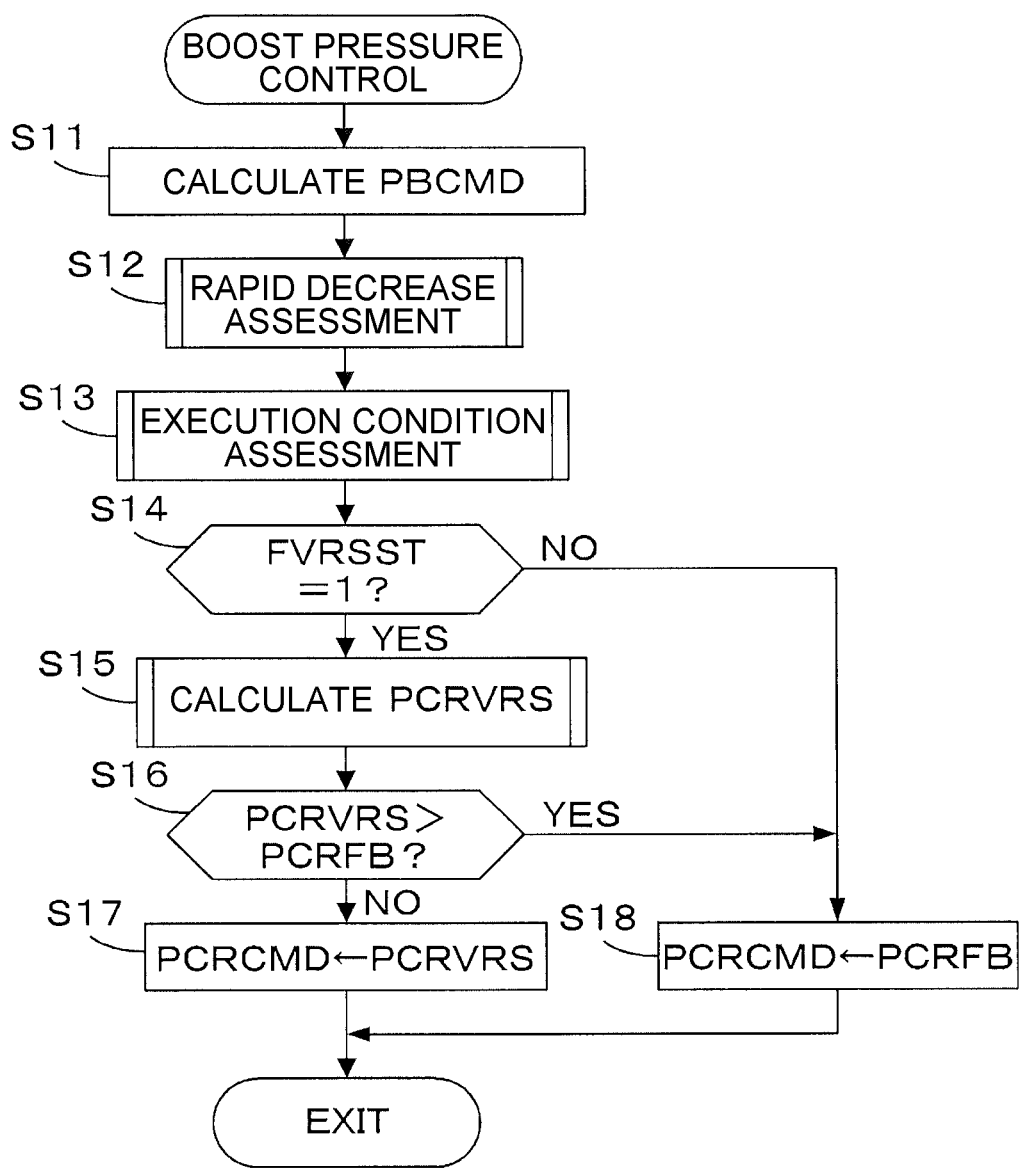
FIG. 4 is a flowchart of a process for performing boost pressure control.

FIG. 4 is a flowchart of a process for performing boost pressure control that includes the above-described speed restriction control. This process is executed by the ECU 20 at a regular computation cycle TCAL (for example, 80 msec).

In step S11, the target boost pressure PBCMD is calculated in accordance with a fuel injection amount QINJ and the engine RPM NE. The fuel injection amount QINJ is a parameter that is calculated so as to be substantially proportional to the accelerator pedal manipulation amount AP and is used as a parameter that indicates the requested torque TRQCMD for the engine 1 in this embodiment. In a case where the accelerator pedal manipulation amount AP changes as illustrated in FIG. 2A, the calculated fuel injection amount QINJ and target boost pressure PBCMD change substantially similarly.

In step S12, a rapid decrease assessment process illustrated in FIG. 5 is executed, and setting of a rapid decrease state flag FRCNGST is performed. The rapid decrease state flag FRCNGST is usually set to "0" and is maintained as "1" in principle in a prescribed maintaining time THOLD in a case where a rapid decrease in the target boost pressure PBCMD is detected.

Figure 7:
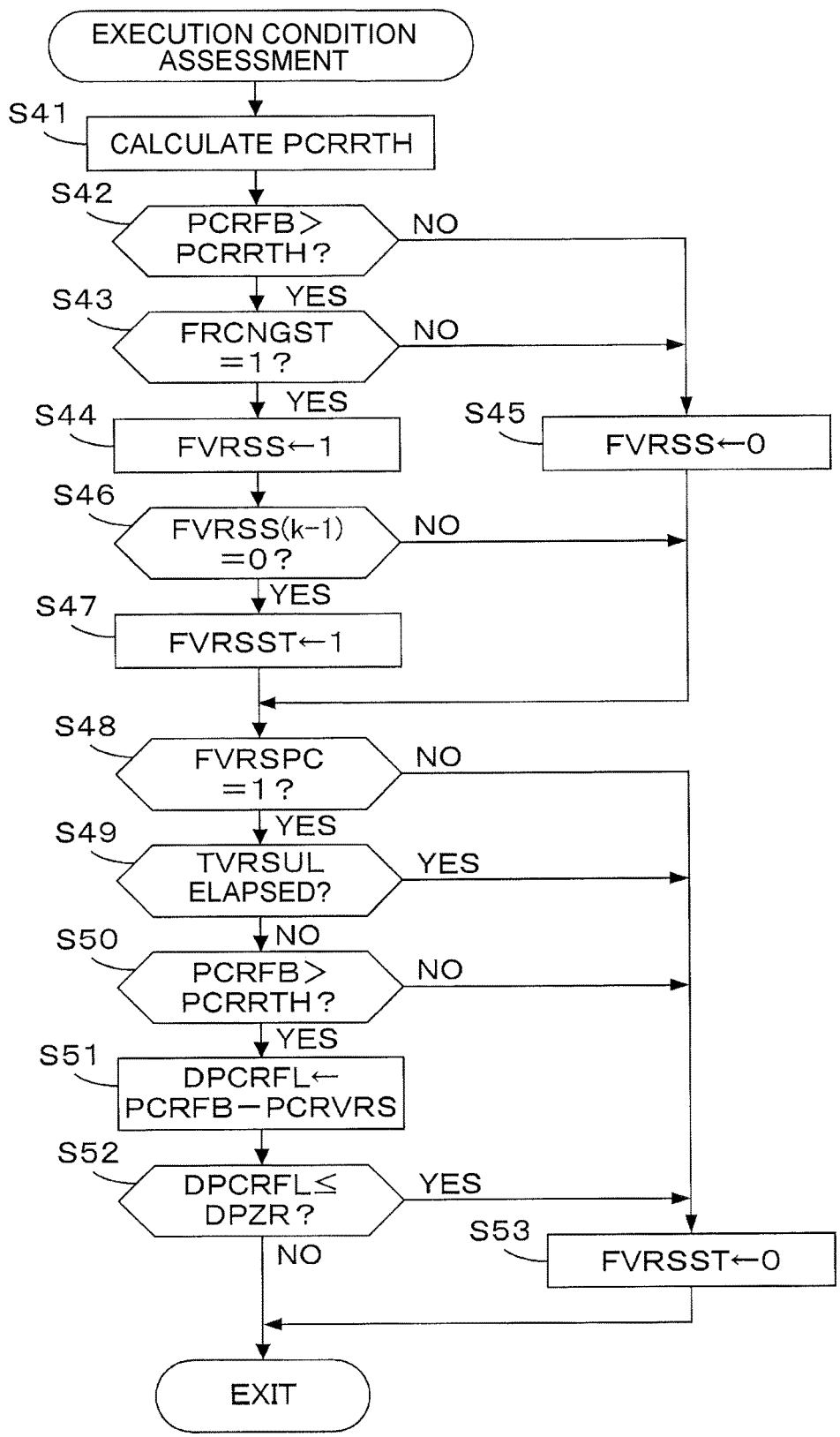
FIG. 7 is a flowchart of an execution condition assessment process that is executed in the process of FIG. 4.

In step S13, a process illustrated in FIG. 7 is executed. In a case where the rapid decrease state flag FRCNGST is "1", a condition for executing the speed restriction control that regulates the increase speed of the vane opening control amount PCRCMD (hereinafter simply referred to as "execution condition") is assessed. In the process of FIG. 7, in a case where it is assessed that the execution condition is satisfied, a speed restriction execution flag FVRSST is set to "1".

In step S14, a determination is made whether or not the speed restriction execution flag FVRSST is "1". In a case where the answer is negative (NO), the vane opening control amount PCRCMD is set to a feedback vane opening control amount (hereinafter referred to as "FB vane opening control amount") PCRFB (step S18). The FB vane opening control amount PCRFB is calculated by another process, which is not illustrated, by using proportional-integral-differential (PID) control in related art such that the detected boost pressure PB matches the target boost pressure PBCMD.

Figure 8:
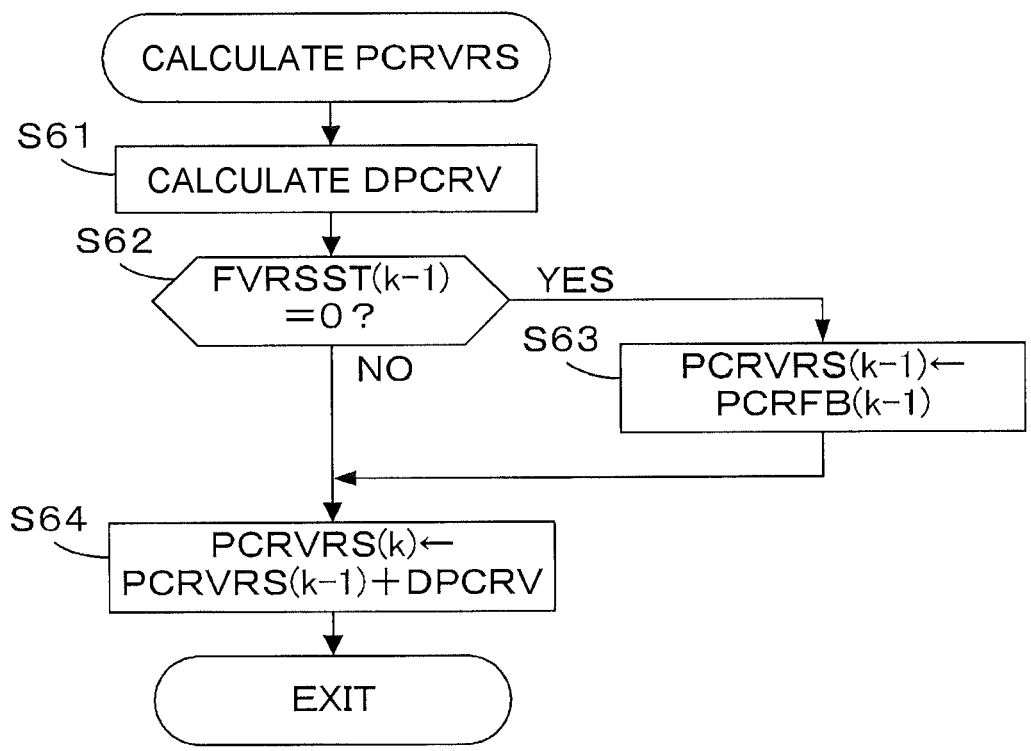
FIG. 8 is a flowchart of a PCRVRS calculation process that is executed in the process of FIG. 4.
Figure 9:
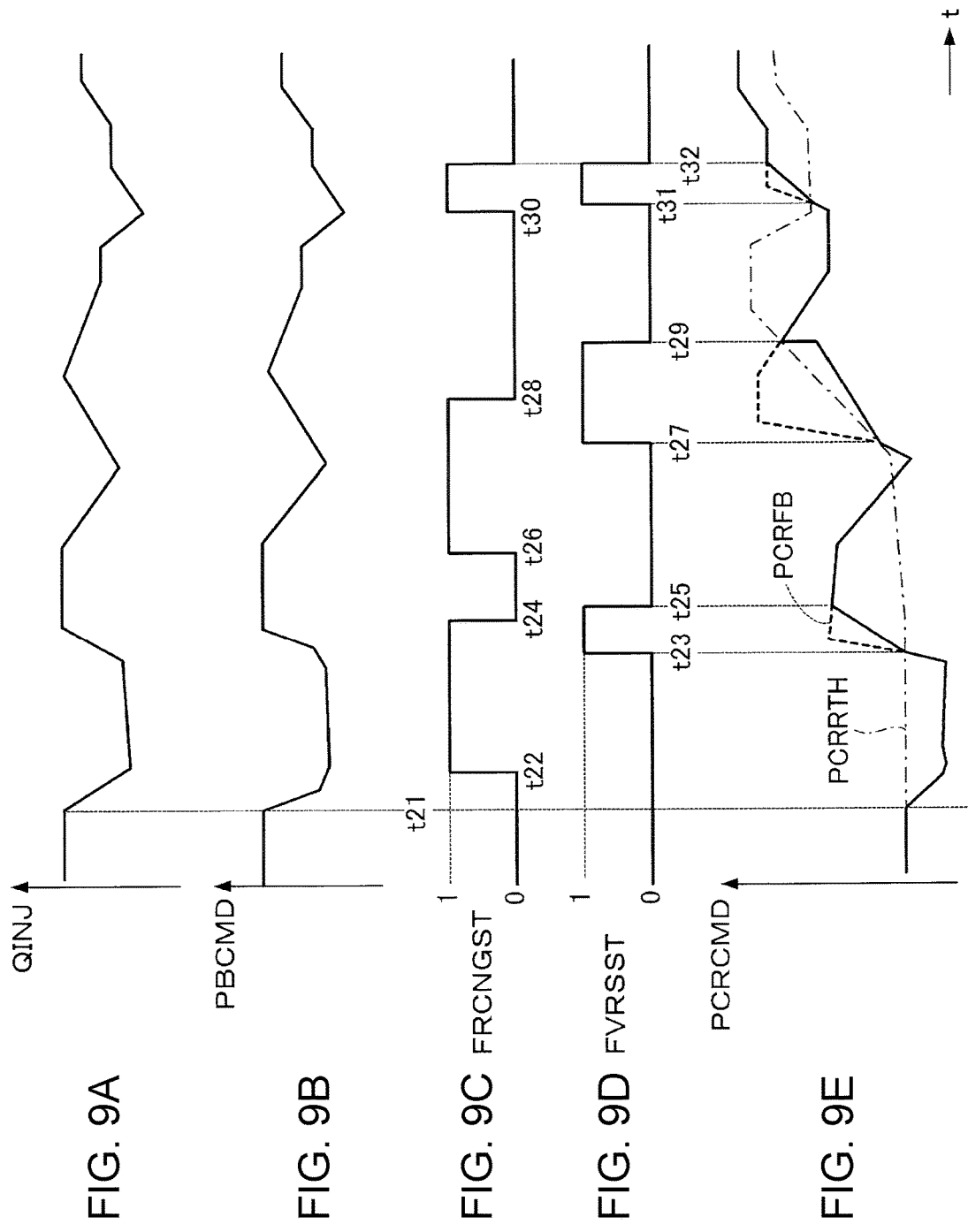
FIGS. 9A to 9E are timing diagrams for explaining the processes of FIG. 7 and FIG. 8.

In a case where the answer in step S14 is affirmative (YES) and the speed restriction control is executed, a PCRVRS calculation process illustrated in FIG. 8 is executed, and a speed restriction opening control amount PCRVRS is calculated. In step S16, a determination is made whether or not the speed restriction opening control amount PCRVRS is more than the FB vane opening control amount PCRFB. In a case where the answer is negative (NO), the vane opening control amount PCRCMD is set to the speed restriction opening control amount PCRVRS (step S17). In a case where the answer in step S16 is affirmative (YES), the process progresses to step S18. Note that in a case where the speed restriction execution flag FVRSST is set to "1" and the speed restriction control is executed, an integral term of the PID control applied to calculation of the FB vane opening control amount PCRFB is retained at the value at a time when the speed restriction control starts.

FIG. 5 is a flowchart of the rapid decrease assessment process that is executed in step S12 in FIG. 4. In step S22, a determination is made whether or not a shifting action flag FSFTC is "0". The shifting action flag FSFTC is set to "1" in a case where a shifting action (shift-up or shift-down) is performed in a transmission that is provided between a crankshaft of the engine 1 and a driving wheel of the vehicle. In a case where the answer in step S22 is affirmative (YES), a determination is made whether or not an exhaust gas reflux execution flag FEGR is "1". The exhaust gas reflux execution flag FEGR is set to "1" in a case where the exhaust gas reflux is executed via the exhaust gas reflux mechanism.

Steps S22 and S23 are steps for assessments about a precondition for executing the speed restriction control. In a case where the answer in either one of steps S22 and S23 is negative (NO), it is assessed that the precondition is not satisfied, a precondition flag FVRSPC is set to "0" (step S26), and the process progresses to step S29. In a case where the answer in step S23 is affirmative (YES), it is assessed that the precondition is satisfied, the precondition flag FVRSPC is set to "1" (step S24), and a target boost pressure decrease amount DPBCMDN is calculated by the following formula (1) (step S25). k in formula (1) is a discretized time that is discretized by the computation cycle TCAL. Note that herein and in the drawings, expressions (k) and (k−1) that represent discretized times are attached to parameter labels in a case where the expressions are demanded for explanation, but are not attached usually.

$$DPBCMDN(k)=PBCMD(k-1)-PBCMD(k) \quad (1)$$

The target boost pressure decrease amount DPBCMDN is a parameter that indicates a decrease amount of the target boost pressure PBCMD per computation cycle, becomes a positive value in a case where the target boost pressure PBCMD decreases, and is fixed to "0" in a case where the target boost pressure decrease amount DPBCMDN becomes a negative value.

In step S27, a determination is made whether or not the target boost pressure decrease amount DPBCMDN is more than a prescribed decrease amount threshold value DPNTH (for example, a value that corresponds to 200 hPa/sec). In a case where the answer is affirmative (YES), a decrease amount integration value SUMDPB is calculated by the following formula (2) (step S28). The initial value of the decrease amount integration value SUMDPB is "0".

$$SUMDPB(k)=SUMDPB(k-1)+DPBCMDN(k) \quad (2)$$

In a case where the answer in step S27 is negative (NO), the process progresses to step S29, and the decrease amount integration value SUMDPB is set to "0". The process progresses to step S32.

In step S30, a determination is made whether or not the decrease amount integration value SUMDPB is more than a prescribed integration threshold value SMDPTH (for example, 400 hPa). In a case where the answer is affirmative (YES), a rapid decrease detection flag FRCNG is set to "1" (step S31). On the other hand, in a case where the answer is negative (NO), the rapid decrease detection flag FRCNG is set to "0" (step S32).

In step S33, a determination is made whether or not the preceding value FRCNG(k−1) of the rapid decrease detection flag is "0". In a case where the answer is affirmative (YES), that is, the present time is immediately after the rapid decrease detection flag FRCNG has changed from "0" to "1", a rapid decrease state flag FRCNGST is set to "1" (step S34), and the process progresses to step S35. In a case where the answer in step S33 is negative (NO), the process immediately progresses to step S35.

In step S35, a determination is made whether or not the prescribed maintaining time THOLD (for example, 1 sec) elapses from a time point when the rapid decrease detection flag FRCNG changes from "1" to "0". The answer is initially negative (NO). The process progresses to step S36, and a determination is made whether or not the speed restriction execution flag FVRSST is "0". The speed restriction execution flag FVRSST is set to "1" in the process of FIG. 7, which will be described later, in a case where the execution condition for the speed restriction control is satisfied.

In a case where the answer in step S36 is affirmative (YES), a determination is further made whether or not the preceding value FVRSST(k−1) of the speed restriction execution flag is "1" (step S37). In a case where the answer in step S36 or S37 is negative (NO), the process is immediately finished. On the other hand, in a case where the answer in step S36 or S37 is affirmative (YES), that is, present time is immediately after the speed restriction execution flag FVRSST has changed from "1" to "0", the rapid decrease state flag FRCNGST is set to "0" even before the prescribed maintaining time THOLD elapses (step S38), and the speed restriction control is finished. Further, in a case where the answer in step S35 is affirmative (YES), the process progresses from step S35 to step S38, and the rapid decrease state flag FRCNGST is set to "0", similarly.

FIGS. 6A to 6G are timing diagrams for explaining the process of FIG. 5 and illustrate the transitions of the fuel injection amount QINJ, the target boost pressure PBCMD, the target boost pressure decrease amount DPBCMDN, the decrease amount integration value SUMDPB, the rapid decrease detection flag FRCNG, the rapid decrease state flag FRCNGST, and the speed restriction execution flag FVRSST.

The fuel injection amount QINJ and the target boost pressure PBCMD start decreasing at time t11. At time t12, the target boost pressure decrease amount DPBCMDN exceeds the prescribed decrease amount threshold value DPNTH, and calculation of the decrease amount integration value SUMDPB is started. At time t13, the decrease amount integration value SUMDPB exceeds the prescribed integration threshold value SMDPTH, the rapid decrease detection flag FRCNG changes from "0" to "1", and the rapid decrease state flag FRCNGST changes from "0" to "1". At time t14, the target boost pressure decrease amount DPBCMDN becomes less than the prescribed decrease amount threshold value DPNTH, and the rapid decrease detection flag FRCNG changes from "1" to "0". The rapid decrease state flag FRCNGST changes from "1" to "0" at time t15 after the prescribed maintaining time THOLD elapses from time t14. In the period between time t13 and time t15, the target boost pressure PBCMD does not rapidly increase while the rapid decrease state flag FRCNGST is "1". Thus, the speed restriction control is not executed.

Subsequently, the target boost pressure decrease amount DPBCMDN again exceeds the prescribed decrease amount threshold value DPNTH at time t16. At time t17, the decrease amount integration value SUMDPB exceeds the prescribed integration threshold value SMDPTH, and the rapid decrease detection flag FRCNG changes from "0" to "1". The rapid decrease detection flag FRCNG returns to "0" at immediately later time t18. However, the rapid decrease state flag FRCNGST is maintained at "1". Subsequently, because the target boost pressure PBCMD rapidly increases, the execution condition for the speed restriction control is satisfied at time t19, and the speed restriction execution flag FVRSST changes from "0" to "1". At time t20, the speed restriction execution flag FVRSST changes "1" to "0" because the execution condition is not satisfied, and the rapid decrease state flag FRCNGST thereby returns from "1" to "0" also (see steps S36 to S38 in FIG. 5).

FIG. 7 is a flowchart of an execution condition assessment process that is executed in step S13 in FIG. 4.

In step S41, a PCRRTH map (not illustrated) is searched in accordance with the fuel injection amount QINJ and the engine RPM NE, and a speed restriction start threshold value PCRRTH is calculated. Focusing on a fact that the FB vane opening control amount PCRFB also rapidly increases when the target boost pressure PBCMD rapidly increases immediately after rapidly decreasing, the PCRRTH map is set such that the rapid increase in the target boost pressure PBCMD at a time immediately after the rapid decrease may be detected. In step S42, a determination is made whether or not the FB vane opening control amount PCRFB exceeds the speed restriction start threshold value PCRRTH. In a case where the answer is affirmative (YES) and it is assessed that the target boost pressure PBCMD rapidly increases, a determination is made whether or not the rapid decrease state flag FRCNGST is "1" (step S43). In a case where the answer in step S42 or S43 is negative (NO), a control start flag FVRSS is set to "0" (step S45), and the process progresses to step S48.

In a case where the answer in step S43 is affirmative (YES), the control start flag FVRSS is set to "1" (step S44), and a determination is made whether or not the preceding value FVRSS(k−1) of the control start flag is "0" (step S46). In a case where the answer is affirmative (YES), that is, the present time is immediately after the control start flag FVRSS changes from "0" to "1", it is assessed that the execution condition for the speed restriction control is satisfied, and the speed restriction execution flag FVRSST is set to "1" (step S47). In a case where the answer in step S46 is negative (NO), the process progresses to step S48.

In step S48, a determination is made whether or not the precondition flag FVRSPC that is set in step S24 or S26 in FIG. 5 is "1". In a case where the answer is negative (NO), it is assessed that the execution condition is not satisfied, and the speed restriction execution flag FVRSST is set to "0" (step S53). In a case where the answer in step S48 is affirmative (YES), a determination is made whether or not an upper limit execution time TVRSUL elapses from the time point when the control start flag FVRSS is changed from "0" to "1" (the time point when the speed restriction execution flag FVRSST is set to "1") (step S49). In a case where the answer is negative (NO), a determination is made whether or not the FB vane opening control amount PCRFB is more than the speed restriction start threshold value PCRRTH (step S50). In a case where the answer in step S50 is negative (NO), the process progresses to step S53, and the speed restriction execution flag FVRSST is set to "0".

In a case where the answer in step S50 is affirmative (YES), the FB vane opening control amount PCRFB and the speed restriction opening control amount PCRVRS are applied to the following formula (3), and a control amount deviation DPCRFL is thereby calculated (step S51).

$$DPCRFL=PCRFB-PCRVRS \qquad (3)$$

In step S52, a determination is made whether or not the control amount deviation DPCRFL is equal to or less than an assessment threshold value DPZR which is set to a value close to "0". In a case where the answer is negative (NO), the process is immediately finished (the speed restriction control is continued). In a case where the answer in step S52 is affirmative (YES), the process progresses to step S53. Further, also in a case where the upper limit execution time TVRSUL elapses and the answer in step S49 becomes affirmative (YES), the process progresses to step S53, and the speed restriction control is finished.

FIG. 8 is a flowchart of a PCRVRS calculation process that is executed in step S15 in FIG. 4.

In step S61, a DPCRV map (not illustrated) is searched in accordance with the fuel injection amount QINJ and the engine RPM NE, and an increase amount DPCRV of the speed restriction opening control amount PCRVRS per computation cycle TCAL is calculated. The DPCRV map is set such that the increase speed of the speed restriction opening control amount PCRVRS becomes an increase speed to the extent that the surging does not occur.

In step S62, a determination is made whether or not the preceding value FVRSST(k−1) of the speed restriction execution flag is "0". In a case where the answer is affirmative (YES), that is, the present time is immediately after the speed restriction execution flag FVRSST changes from "0" to "1", the preceding value PCRVRS(k−1) of the speed restriction opening control amount is set to the preceding value PCRFB(k−1) of the FB vane opening control amount (step S63), and the process progresses to step S64. In a case where the answer in step S62 is negative (NO), the process immediately progresses to step S64.

In step S64, the preceding value PCRVRS(k−1) of the speed restriction opening control amount and the increase amount DPCRV are applied to the following formula (4), and a speed restriction opening control amount PCRVRS(k) is thereby calculated.

$$PCRVRS(k)=PCRVRS(k-1)+DPCRV \qquad (4)$$

FIG. 9A to FIG. 9E are timing diagrams for explaining the above-described processes of FIG. 7 and FIG. 8 and respectively illustrate the transitions of the fuel injection amount QINJ, the target boost pressure PBCMD, the rapid decrease state flag FRCNGST, the speed restriction execution flag FVRSST, and the vane opening control amount PCRCMD. Note that in FIG. 9E, the broken line indicates the transition of the FB vane opening control amount PCRFB, and the one-dot chain line indicates the transition of the speed restriction start threshold value PCRRTH. In the period in which the speed restriction control is executed (the period in which the speed restriction execution flag FVRSST is "1"), the vane opening control amount PCRCMD matches the speed restriction opening control amount PCRVRS. In the other periods, the vane opening control amount PCRCMD matches the FB vane opening control amount PCRFB.

The fuel injection amount QINJ and the target boost pressure PBCMD start decreasing at time t21. In response to that, the vane opening control amount PCRCMD also starts decreasing. At time t22, the rapid decrease state flag FRCNGST is set to "1". At time t23, the FB vane opening control amount PCRFB exceeds the speed restriction start threshold value PCRRTH, the speed restriction execution flag FVRSST is set to "1", and the speed restriction control for setting the vane opening control amount PCRCMD to the speed restriction opening control amount PCRVRS is started. At time t24, the rapid decrease state flag FRCNGST is returned to "0", but the speed restriction control is continued. At time t25, the speed restriction opening control amount PCRVRS reaches the FB vane opening control amount PCRFB, and then the answer in step S52 in FIG. 7 becomes affirmative (YES), and the speed restriction control is finished.

Subsequently, at time t26, the rapid decrease state flag FRCNGST is set to "1". At time t27, the FB vane opening control amount PCRFB exceeds the speed restriction start threshold value PCRRTH, the speed restriction execution flag FVRSST is set to "1", and the speed restriction control is started. At time t28, the rapid decrease state flag FRCNGST is returned to "0", but the speed restriction control is continued. At time t29, because the FB vane opening control amount PCRFB becomes equal to or less than the speed restriction start threshold value PCRRTH, the answer in step S50 in FIG. 7 becomes negative (NO), and the speed restriction control is finished.

Subsequently, at time t30, the rapid decrease state flag FRCNGST is set to "1". At immediately later time t31, the FB vane opening control amount PCRFB exceeds the speed restriction start threshold value PCRRTH, the speed restriction execution flag FVRSST is set to "1", and the speed restriction control is started. At time t32, because the speed restriction opening control amount PCRVRS reaches the FB vane opening control amount PCRFB, the speed restriction control is finished. At time t32, because the speed restriction execution flag FVRSST becomes "0", the answers in step S36 and step S37 in FIG. 5 become affirmative (YES), and the rapid decrease state flag FRCNGST is returned to "0".

As described above, in this embodiment, the FB vane opening control amount PCRFB of the variable vane 12 is calculated such that the detected boost pressure PB matches the target boost pressure PBCMD, and the vane opening VO is thereby controlled. Immediately after the rapid decrease in the target boost pressure PBCMD is detected, that is, in the period in which the rapid decrease state flag FRCNGST is "1", the execution condition for the speed restriction control that restricts the increase speed of the vane opening control amount PCRCMD is assessed by the process of FIG. 7. Specifically, in a state where the exhaust gas reflux by the exhaust gas reflux mechanism is executed, in a case where the rapid decrease in the target boost pressure PBCMD is detected and where the target boost pressure PBCMD rapidly increases immediately after the detection, it is assessed that the execution condition for the speed restriction control is satisfied. In a case where it is assessed that the execution condition is satisfied, the increase speed of the vane opening control amount PCRCMD, in other words, the changing speed in the direction for decreasing the opening VO of the variable vane 12 is set to the changing speed that is decided by the increase amount DPCRV, and the speed restriction opening control amount PCRVRS is thereby calculated. The vane opening control amount PCRCMD is set to the speed restriction opening control amount PCRVRS, and the variable vane 12 is driven. In a specific transient operation state where the execution condition for the speed restriction control is satisfied, in a case where the vane opening control amount PCRCMD is rapidly changed in the direction for decreasing the vane opening VO when the exhaust gas reflux is executed, it is possible that the exhaust gas pressure on an upstream side of the turbine rises, the exhaust gas reflux amount increases, the intake air amount temporarily decreases, and the surging is thereby caused. However, the changing speed of the vane opening control amount PCRCMD is regulated, and the surging may thereby be avoided.

Further, in a state where the target boost pressure decrease amount DPBCMDN that indicates the decrease amount of the target boost pressure PBCMD per unit time exceeds the prescribed decrease amount threshold value DPNTH, the integration value SUMDPB of the target boost pressure decrease amount DPBCMDN is calculated. In a case where the integration value SUMDPB exceeds the prescribed integration threshold value SMDPTH, it is assessed that the rapid decrease in the target boost pressure PBCMD occurs. Thus, for example, without being influenced by a slight change in an accelerator pedal pressing amount, the rapid decrease in the target boost pressure PBCMD as a cause of the surging may be assessed highly precisely.

Further, in a case where the FB vane opening control amount PCRFB exceeds the speed restriction start threshold value PCRRTH before the prescribed maintaining time THOLD elapses from the time point when the target boost pressure decrease amount DPBCMDN decreases from the state where the target boost pressure decrease amount DPBCMDN exceeds the prescribed decrease amount threshold value DPNTH to the prescribed decrease amount threshold value DPNTH or less, it is assessed that the execution condition for the speed restriction control is satisfied. The speed restriction start threshold value PCRRTH is set such that the rapid increase in the target boost pressure PBCMD may be assessed. Thus, the operation state where the speed restriction control is to be executed may appropriately be assessed.

Further, in a state where the execution condition for the speed restriction control is satisfied and in a case where the FB vane opening control amount PCRFB becomes equal to or less than the speed restriction start threshold value PCRRTH, in a case where the upper limit execution time TVRSUL elapses from the time point when the execution condition is satisfied, or in a case where the speed restriction opening control amount PCRVRS reaches the FB vane opening control amount PCRFB, it is assessed that the execution condition is not satisfied. Thus, the operation state where the speed restriction control is to be finished may appropriately be assessed.

In this embodiment, the variable vane 12 configures an exhaust gas flow amount variable device, and the boost pressure sensor 22 corresponds to a boost pressure detection unit. Further, the actuator of the variable vane 12 and the ECU 20 configure a boost pressure control unit, the ECU 20 configures a target boost pressure calculation unit, a target boost pressure rapid decrease assessment unit, and a speed restriction condition assessment unit.

[First Modification]

In the above-described execution condition assessment process of FIG. 7, the FB vane opening control amount PCRFB becomes more than the speed restriction start threshold value PCRRTH (step S42), and the rapid increase in the target boost pressure PBCMD is thereby assessed. However, an increase amount DPBCMDP (=PBCMD(k)−PBCMD(k−1)) of the target boost pressure PBCMD per computation cycle TCAL exceeds a preset rapid increase assessment threshold value, and the rapid increase in the target boost pressure PBCMD may thereby be assessed.

[Second Modification]

Figure 10:
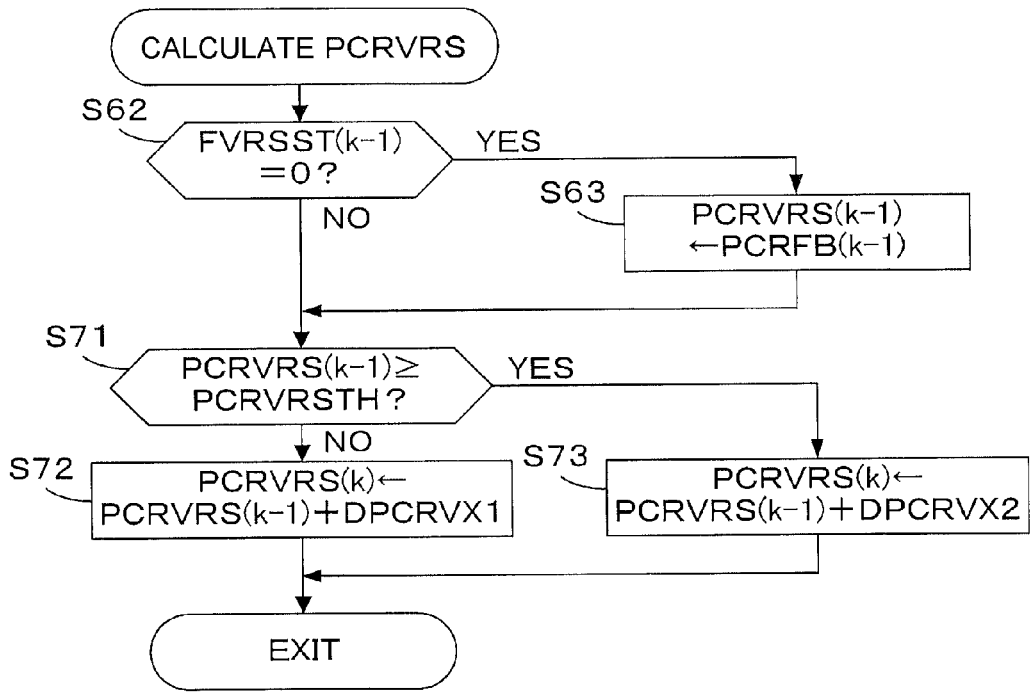
FIG. 10 is a flowchart that illustrates a modification of the PCRVRS calculation process that is illustrated in FIG. 8.

FIG. 10 is a flowchart that illustrates a modification of the PCRVRS calculation process illustrated in FIG. 8. This process is the process from which steps S61 and S64 in FIG. 8 are removed and to which steps S71 to S73 are added.

In step S71, a determination is made whether or not the preceding value PCRVRS(k−1) of the speed restriction opening control amount is equal to or more than an opening control amount threshold value PCRVRSTH. In a case where the answer is negative (NO), the speed restriction opening control amount PCRVRS(k) is calculated by using the following formula (5) (step S72). DPCRVX1 in formula (5) is a preset first increase amount.

$$PCRVRS(k)=PCRVRS(k-1)+DPCRVX1 \qquad (5)$$

In a case where the answer in step S71 is affirmative (YES), the speed restriction opening control amount PCRVRS(k) is calculated by using the following formula (6) (step S73). DPCRVX2 in formula (6) is a preset second increase amount and is set such that the relationship of DPCRVX2<DPCRVX1 is satisfied.

$$PCRVRS(k)=PCRVRS(k-1)+DPCRVX2 \qquad (6)$$

Figure 11:
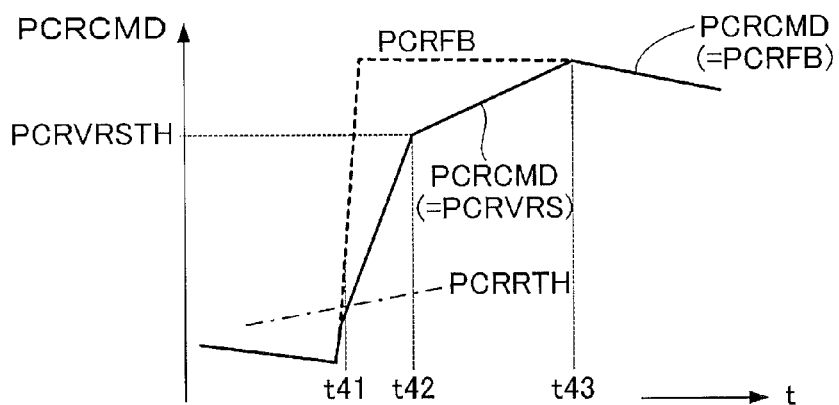
FIG. 11 is a timing diagram for explaining a process of FIG. 10.

FIG. 11 is a timing diagram for explaining the process of FIG. 10. The transition of the FB vane opening control amount PCRFB is indicated by the broken line, the speed restriction opening control amount PCRVRS is indicated by the solid line, and the speed restriction start threshold value PCRRTH is indicated by the one-dot chain line.

In a case where the FB vane opening control amount PCRFB exceeds the speed restriction start threshold value PCRRTH at time t41, the speed restriction opening control amount PCRVRS is calculated by using formula (5). Subsequently, until time t42 is reached, the speed restriction opening control amount PCRVRS is calculated by using formula (5). The speed restriction opening control amount PCRVRS reaches the opening control amount threshold value PCRVRSTH at time t42, and the speed restriction opening control amount PCRVRS is thereafter calculated by using formula (6).

That is, the comparatively large first increase amount DPCRVX1 is applied in a range in which the speed restriction opening control amount PCRVRS is less than the opening control amount threshold value PCRVRSTH. The comparatively small second increase amount DPCRVX2 is applied in a range in which the speed restriction opening control amount PCRVRS is equal to or more than the opening control amount threshold value PCRVRSTH.

In this modification, the speed restriction opening control amount PCRVRS is set so as to gradually approach the FB vane opening control amount PCRFB. Thus, at time t43 when the speed restriction control is finished, switching from the speed restriction opening control amount PCRVRS to the FB vane opening control amount PCRFB may smoothly be performed (a rapid and large change of the changing speed of the vane opening control amount PCRCMD at the switching time point may be avoided).

Note that the present disclosure is not limited to the above-described embodiment, but various modifications are possible. For example, in the above-described embodiment, an example is described where the present disclosure is applied to the control device of the internal combustion engine that includes the turbocharger which has the variable vane. However, the present disclosure is applicable to a control device that is configured to include a turbocharger with a fixed capacity (not including the variable vane), a bypass path which bypasses a turbine of the turbocharger, and a waste gate valve provided in the bypass path, to change the exhaust gas amount which flows into the turbine by changing the opening of the waste gate valve, and to thereby control the boost pressure. In this case, the waste gate valve corresponds to the exhaust gas flow amount variable device.

A first aspect of the present disclosure provides a control device of an internal combustion engine that includes a supercharger which has a compressor which pressurizes air taken into the internal combustion engine and a turbine which is connected with the compressor and driven to rotate by kinetic energy of exhaust gas of the engine, an exhaust gas flow amount variable device which changes a flow amount of exhaust gas blown to a turbine wheel of the turbine, and an exhaust gas reflux mechanism which includes an exhaust gas reflux path which connects an exhaust path and an intake path of the engine together, refluxes exhaust gas of the engine to the intake path, and is provided between an upstream side of the turbine in the exhaust path and a downstream side of the compressor in the intake path, the control device including: a target boost pressure calculation unit that calculates a target boost pressure (PBCMD) in accordance with a requested torque (TRQCMD) for the engine; a boost pressure detection unit that detects an air pressure which is pressurized by the compressor as a boost pressure; a boost pressure control unit that calculates an opening control amount (PCRFB) of the exhaust gas flow amount variable device such that the detected boost pressure (PB) matches the target boost pressure (PBCMD) and controls the boost pressure (PB) by changing an opening (VO) of the exhaust gas flow amount variable device; a target boost pressure rapid decrease assessment unit that detects a rapid decrease in the target boost pressure (PBCMD); and an execution condition assessment unit that assesses an execution condition for speed restriction control which restricts a changing speed of the opening control amount (PCRFB) immediately after the rapid decrease in the target boost pressure is detected, in which the execution condition assessment unit assesses that the execution condition is satisfied in a state where exhaust gas reflux by the exhaust gas reflux mechanism is executed and in a case where the rapid decrease in the target boost pressure (PBCMD) is detected and the target boost pressure (PBCMD) rapidly increases immediately after the detection, and the boost pressure control unit calculates a restriction opening control amount (PCRVRS) so as to regulate a changing speed of the opening control amount (PCRFB) in a direction to decrease the opening (VO) of the exhaust gas flow amount variable device in a case where the execution condition is assessed as satisfied and controls the opening of the exhaust gas flow amount variable device by using the restriction opening control amount (PCRVRS).

In this configuration, the opening control amount of the exhaust gas flow amount variable device is calculated such that the detected boost pressure matches the target boost pressure, and the exhaust gas flow amount variable device is thereby controlled. The execution condition for the speed restriction control which restricts the changing speed of the opening control amount is assessed immediately after the rapid decrease in the target boost pressure is detected. Specifically, in a state where exhaust gas reflux by the exhaust gas reflux mechanism is executed and in a case where the rapid decrease in the target boost pressure is detected and the target boost pressure rapidly increases immediately after the detection, it is assessed that the execution condition is satisfied, and the speed restriction control is executed. That is, the restriction opening control amount is calculated such that the changing speed of the opening control amount in the direction to decrease the opening of the exhaust gas flow amount variable device is regulated, and the exhaust gas flow amount variable device is controlled by using the restriction opening control amount. In the above-described specific transient operation state, in a case where the opening control amount is rapidly changed in the direction to decrease the opening of the exhaust gas flow amount variable device when the exhaust gas reflux is executed, it is possible that the exhaust gas pressure on an upstream side of the turbine rises, the exhaust gas reflux amount increases, the intake air amount temporarily decreases, and the surging is thereby caused. However, the changing speed of the opening control amount is regulated, and the surging may thereby be avoided.

A second aspect of the present disclosure provides the control device of an internal combustion engine according to the first aspect, in which the target boost pressure rapid decrease assessment unit may calculate an integration value (SUMDPB) of a target boost pressure decrease amount (DPBCMDN) that indicates a decrease amount of the target boost pressure (PBCMD) per unit time in a state where the target boost pressure decrease amount (DPBCMDN) exceeds a prescribed decrease amount threshold value (DPNTH) and may assess that the rapid decrease in the target boost pressure (PBCMD) occurs in a case where the integration value (SUMDPB) exceeds a prescribed integration threshold value (SMDPTH).

In this configuration, in a state where the target boost pressure decrease amount that indicates the decrease amount of the target boost pressure per unit time exceeds the prescribed decrease amount threshold value, the integration value of the target boost pressure decrease amount is calculated. In a case where the integration value exceeds the prescribed integration threshold value, it is assessed that the rapid decrease in the target boost pressure occurs. Thus, for example, without being influenced by a slight change in an accelerator pedal pressing amount, the rapid decrease in the target boost pressure as a cause of the surging may be assessed highly precisely.

A third aspect of the present disclosure provides the control device of an internal combustion engine according to the second aspect, in which the execution condition assessment unit may assess that the execution condition is satisfied in a case where the opening control amount (PCRFB) exceeds a restriction start threshold value (PCRRTH) before a prescribed maintaining time (THOLD) elapses from a time point when the target boost pressure decrease amount (DPBCMDN) decreases from a state where the target boost pressure decrease amount (DPBCMDN) exceeds the prescribed decrease amount threshold value (DPNTH) to the prescribed decrease amount threshold value (DPNTH) or less, and the restriction start threshold value (PCRRTH) may be set such that detection of a rapid increase in the target boost pressure (PBCMD) is feasible.

In this configuration, it is assessed that the execution condition for the speed restriction control is satisfied in a case where the opening control amount exceeds the restriction start threshold value before the prescribed maintaining time elapses from the time point when the target boost pressure decrease amount decreases from a state where the target boost pressure decrease amount exceeds the prescribed decrease amount threshold value to the prescribed decrease amount threshold value or less, and the restriction start threshold value is set such that detection of the rapid increase in the target boost pressure is feasible. Thus, the operation state where the speed restriction control is to be executed may appropriately be assessed.

A fourth aspect of the present disclosure provides the control device of an internal combustion engine according to the third aspect, in which the execution condition assessment unit may assess that the execution condition is not satisfied in a state where the execution condition is satisfied and in a case where the opening control amount (PCRFB) becomes equal to or less than the restriction start threshold value (PCRRTH), in a case where an upper limit execution time (TVRSUL) elapses from a time point when the execution condition is satisfied, or in a case where the restriction opening control amount (PCRVRS) reaches the opening control amount (PCRFB).

In this configuration, in a state where the execution condition for the speed restriction control is satisfied and in a case where the opening control amount becomes equal to or less than the speed restriction start threshold value, in a case where the upper limit execution time elapses from the time point when the execution condition is satisfied, or in a case where the restriction opening control amount reaches the opening control amount, it is assessed that the execution condition is not satisfied. Thus, the operation state where the changing speed restriction of the opening control amount is to be finished may appropriately be assessed.

Obviously, numerous modifications and variations of the present invention are possible in light of the above teachings. It is therefore to be understood that within the scope of the appended claims, the invention may be practiced otherwise than as specifically described herein.

What is claimed is:

1. A control device of an internal combustion engine that includes a turbocharger which has a compressor which pressurizes air taken into the internal combustion engine and a turbine which is connected with the compressor and driven to rotate by kinetic energy of exhaust gas of the engine, an exhaust gas flow amount variable device which changes a flow amount of exhaust gas blown to a turbine wheel of the turbine, and an exhaust gas reflux mechanism which includes an exhaust gas reflux path which connects an exhaust path and an intake path of the engine together, refluxes exhaust gas of the engine to the intake path, and is provided between an upstream side of the turbine in the exhaust path and a downstream side of the compressor in the intake path, the control device comprising:

a target boost pressure calculation unit that calculates a target boost pressure in accordance with a requested torque for the engine;

a boost pressure detection unit that detects an air pressure which is pressurized by the compressor as a boost pressure;

a boost pressure control unit that calculates an opening control amount of the exhaust gas flow amount variable device such that the detected boost pressure matches the target boost pressure and controls the boost pressure by changing an opening of the exhaust gas flow amount variable device;

a target boost pressure decrease assessment unit that detects a decrease state where a target boost pressure decrease amount that indicates a decrease amount of the target boost pressure per unit time exceeds a prescribed decrease amount threshold value; and an execution condition assessment unit that assesses an execution condition for speed restriction control to decrease a changing speed of the opening control amount immediately after the decrease state is detected, wherein the execution condition assessment unit assesses that the execution condition is satisfied in a state where exhaust gas reflux by the exhaust gas reflux mechanism is executed and in a case where the decrease state is detected and the opening control amount exceeds a restriction start threshold value before a prescribed maintaining time elapses from a time point when the target boost pressure decrease amount decreases from the decrease state where the target boost pressure decrease amount exceeds the prescribed decrease amount threshold value to the prescribed decrease amount threshold value or less immediately after the detection, wherein the boost pressure control unit calculates a restriction opening control amount so as to decrease the changing speed of the opening control amount in a direction to decrease the opening of the exhaust gas flow amount variable device in a case where the execution condition is assessed as satisfied, and wherein the boost pressure control unit controls the opening of the exhaust gas flow amount variable device using the restriction opening control amount when the execution condition is assessed as satisfied, the restriction opening control amount being less than the opening control amount.

2. The control device according to claim 1, wherein the target boost pressure decrease assessment unit calculates an integration value of a target boost pressure decrease amount that indicates a decrease amount of the target boost pressure per unit time in a state where the target boost pressure decrease amount exceeds a prescribed decrease amount threshold value and assesses that the decrease state occurs in a case where the integration value exceeds a prescribed integration threshold value.

3. The control device according to claim 2, wherein the execution condition assessment unit assesses that the execution condition is satisfied in a case where the opening control amount exceeds a restriction start threshold value before a prescribed maintaining time elapses from a time point when the target boost pressure decrease amount decreases from a state where the target boost pressure decrease amount exceeds the prescribed decrease amount threshold value to the prescribed decrease amount threshold value or less.

4. The control device according to claim 3, wherein the execution condition assessment unit assesses that the execution condition is no longer satisfied in a case where the opening control amount becomes equal to or less than the restriction start threshold value, in a case where an upper limit execution time elapses from a time point when the execution condition was initially satisfied, or in a case where the restriction opening control amount reaches the opening control amount.

5. A control device of an internal combustion engine, comprising:
   a boost pressure sensor to detect a boost pressure of air which is pressurized by a compressor of a turbocharger including a turbine to be rotated by kinetic energy of exhaust gas of the internal combustion engine to drive the compressor; and
   a processor configured to
      calculate a target boost pressure in accordance with a target torque to be generated by the internal combustion engine;
      calculate an opening control amount of an exhaust gas flow amount variable device to control a flow amount of the exhaust gas blown to the turbine;
      control the exhaust gas flow amount variable device in accordance with the opening control amount such that the boost pressure matches the target boost pressure;
      determine a decrease state where a target boost pressure decrease amount that indicates a decrease amount of the target boost pressure per unit time exceeds a prescribed decrease amount threshold value;
      determine that an execution condition is satisfied in a case where the opening control amount exceeds a restriction start threshold value before a prescribed maintaining time elapses from a time point when the target boost pressure decrease amount decreases from the decrease state where the target boost pressure decrease amount exceeds the prescribed decrease amount threshold value to the prescribed decrease amount threshold value or less immediately after the decrease state is determined while the exhaust gas is refluxed by an exhaust gas reflux mechanism which includes an exhaust gas reflux path connecting an upstream side of the turbine in an exhaust path and a downstream side of the compressor in an intake path to reflux the exhaust gas from the exhaust path to the intake path;
      calculate a restriction opening control amount so as to decrease a changing speed of the opening control amount to decrease an opening of the exhaust gas flow amount variable device in a case where the execution condition is satisfied; and
      control the opening of the exhaust gas flow amount variable device using the restriction opening control amount when the execution condition is satisfied, the restriction opening control amount being less than the opening control amount.

6. The control device according to claim 5, wherein the processor calculates an integration value of a target boost pressure decrease amount that indicates a decrease amount of the target boost pressure per unit time in a state where the target boost pressure decrease amount exceeds a prescribed decrease amount threshold value and assesses that the decrease state occurs in a case where the integration value exceeds a prescribed integration threshold value.

7. The control device according to claim 6, wherein processor determines that the execution condition is satisfied in a case where the opening control amount exceeds a restriction start threshold value before a prescribed maintaining time elapses from a time point when the target boost pressure decrease amount decreases from a state where the target boost pressure decrease amount exceeds the prescribed decrease amount threshold value to the prescribed decrease amount threshold value or less.

8. The control device according to claim 7, wherein the processor determines that the execution condition is no longer satisfied in a case where the opening control amount becomes equal to or less than the restriction start threshold value, in a case where an upper limit execution time elapses from a time point when the execution condition was initially satisfied, or in a case where the restriction opening control amount reaches the opening control amount.

9. A method for controlling an internal combustion engine, comprising:
   detecting a boost pressure of air which is pressurized by a compressor of a turbocharger including a turbine to be rotated by kinetic energy of exhaust gas of the internal combustion engine to drive the compressor;
   calculating a target boost pressure in accordance with a target torque to be generated by the internal combustion engine;
   calculating an opening control amount of an exhaust gas flow amount variable device to control a flow amount of the exhaust gas blown to the turbine;
   controlling the exhaust gas flow amount variable device in accordance with the opening control amount such that the boost pressure matches the target boost pressure;
   determining a decrease state where a target boost pressure decrease amount that indicates a decrease amount of the target boost pressure per unit time exceeds a prescribed decrease amount threshold value;
   determining that an execution condition is satisfied in a case where the opening control amount exceeds a restriction start threshold value before a prescribed maintaining time elapses from a time point when the target boost pressure decrease amount decreases from the decrease state where the target boost pressure decrease amount exceeds the prescribed decrease amount threshold value to the prescribed decrease amount threshold value or less immediately after the decrease state is determined while the exhaust gas is refluxed by an exhaust gas reflux mechanism which includes an exhaust gas reflux path connecting an upstream side of the turbine in an exhaust path and a downstream side of the compressor in an intake path to reflux the exhaust gas from the exhaust path to the intake path;
   calculating a restriction opening control amount so as to decrease a changing speed of the opening control amount to decrease an opening of the exhaust gas flow amount variable device in a case where the execution condition is satisfied; and
   controlling the opening of the exhaust gas flow amount variable device using the restriction opening control amount when the execution condition is satisfied, the restriction opening control amount being less than the opening control amount.

\* \* \* \* \*